US012585911B2

(12) United States Patent
Cui et al.

(10) Patent No.: US 12,585,911 B2
(45) Date of Patent: Mar. 24, 2026

(54) OPTICAL ANTI-COUNTERFEITING ELEMENT AND OPTICAL ANTI-COUNTERFEITING PRODUCT

(71) Applicants: ZHONGCHAO SPECIAL SECURITY TECHNOLOGY CO., LTD, Beijing (CN); CHINA BANKNOTE PRINTING AND MINTING CORP., Beijing (CN)

(72) Inventors: Haibo Cui, Beijing (CN); Kai Sun, Beijing (CN)

(73) Assignees: ZHONGCHAO SPECIAL SECURITY TECHNOLOGY CO., LTD, Beijing (CN); CHINA BANKNOTE PRINTING AND MINTING CORP., Beijing (CN)

( * ) Notice: Subject to any disclaimer, the term of this patent is extended or adjusted under 35 U.S.C. 154(b) by 0 days.

(21) Appl. No.: 18/878,825

(22) PCT Filed: Jul. 24, 2023

(86) PCT No.: PCT/CN2023/108966
§ 371 (c)(1),
(2) Date: Dec. 24, 2024

(87) PCT Pub. No.: WO2024/022302
PCT Pub. Date: Feb. 1, 2024

(65) Prior Publication Data
US 2025/0217617 A1 Jul. 3, 2025

(30) Foreign Application Priority Data
Jul. 25, 2022 (CN) .......................... 202210878916.1

(51) Int. Cl.
*G06K 19/18* (2006.01)
*B42D 25/324* (2014.01)
(Continued)

(52) U.S. Cl.
CPC ........... *G06K 19/18* (2013.01); *B42D 25/324* (2014.10); *B42D 25/328* (2014.10); *G06K 19/14* (2013.01);
(Continued)

(58) Field of Classification Search
None
See application file for complete search history.

(56) References Cited

U.S. PATENT DOCUMENTS 11,345,179 B2 * 5/2022 Imhof .................. B42D 25/324
11,554,603 B2 * 1/2023 Delst ...................... G02B 5/045
(Continued)

FOREIGN PATENT DOCUMENTS

CN 103576216 A * 2/2014 ........... B42D 25/425
CN 103847289 A 6/2014
(Continued)

OTHER PUBLICATIONS

English Translation of CN-103576216A (Year: 2014).*
First Office Action received in 202210878916.1 (Jul. 29, 2025), 15 pages.

*Primary Examiner* — Thien M Le
*Assistant Examiner* — April A Taylor
(74) *Attorney, Agent, or Firm* — Riverside Law LLP

(57) ABSTRACT

The disclosure provides an optical anti-counterfeiting element and an optical anti-counterfeiting product. The optical anti-counterfeiting element comprises a substrate and a plurality of reflective mirror segments; wherein each of the plurality of reflective mirror segments is arranged on one side surface of the substrate according to a preset rule, the plurality of reflective mirror segments are arranged at intervals and two adjacent reflective mirror segments form a gap, and the plurality of reflective mirror segments and/or the gap provide pixels of macroscopic images, thereby forming macroscopic dynamic images and stereoscopic images. The
(Continued)

disclosure solves the problem in the related art that an optical anti-counterfeiting element has a low yield.

18 Claims, 5 Drawing Sheets

(51) Int. Cl.

| | | |
|---|---|---|
| *B42D 25/328* | (2014.01) |
| *G06K 19/14* | (2006.01) |
| *G06K 19/16* | (2006.01) |
| G06K 19/02 | (2006.01) |
| G06K 19/08 | (2006.01) |
| G06K 19/12 | (2006.01) |

(52) U.S. Cl.
CPC .............. *G06K 19/16* (2013.01); *G06K 19/02* (2013.01); *G06K 19/086* (2013.01); *G06K 19/12* (2013.01)

(56) References Cited

U.S. PATENT DOCUMENTS

| | | | |
|---|---|---|---|
| 2014/0247499 | A1 | 9/2014 | Doublet |
| 2016/0101643 | A1 | 4/2016 | Cape |
| 2022/0063318 | A1 | 3/2022 | Imhof |

FOREIGN PATENT DOCUMENTS

| | | | |
|---|---|---|---|
| CN | 104118236 A | | 10/2014 |
| CN | 103358808 B | * | 12/2015 |
| CN | 107379814 A | | 11/2017 |
| CN | 108454264 A | | 8/2018 |
| CN | 108603949 A | | 9/2018 |
| CN | 108790469 A | | 11/2018 |
| CN | 112572014 A | | 3/2021 |
| CN | 112848744 A | | 5/2021 |
| CN | 112888575 A | | 6/2021 |
| CN | 114537015 A | | 5/2022 |

* cited by examiner

OPTICAL ANTI-COUNTERFEITING ELEMENT AND OPTICAL ANTI-COUNTERFEITING PRODUCT

CROSS-REFERENCE TO RELATED APPLICATION

This application is a U.S. national phase application filed under 35 U.S.C. § 371 claiming benefit to International Patent Application No. PCT/CN2023/108966, filed on Jul. 24, 2023, which claims priority to Chinese Patent Application No. 202210878916.1, filed on Jul. 25, 2022, both of which are hereby incorporated by reference in their entirety.

TECHNICAL FIELD

The disclosure relates to the technical field of anti-counterfeiting, and in particular, to an optical anti-counterfeiting element and an optical anti-counterfeiting product.

BACKGROUND

An optical anti-counterfeiting element having a micro-lens array has a unique visual effect and recognizability, and thus is widely applied to high-security products such as banknotes, credit cards, passports and securities as well as other high-value-added products.

CN 200480040733 and CN 200680026431 disclose an anti-counterfeiting element having a micro-lens array and a micro-graphic-text array on two surfaces of a substrate, respectively, wherein the micro-graphic-text array is located near a focal plane of the micro-lens array, and a pattern with a certain depth of field or presenting a dynamic effect is reproduced by means of a Moire amplification effect of the micro-lens array on the micro-graphic-text array.

In an optical micro-structure anti-counterfeiting element disclosed in the patent No. CN 200480040733, the micro-lens array and the micro-graphic-text array are respectively located in their respective planes; therefore, in a manufacturing process, first it is necessary to respectively prepare original versions of the micro-graphic-text array and the micro-lens array, and then to respectively copy the micro-graphic-text array and the micro-lens array in batches on both sides of a thin film substrate during production. Drawbacks of the anti-counterfeiting element of such a structure lie in that: (1) the structure requires that the micro-lens array and the micro-graphic-text array are both arranged periodically, and when original versions thereof are manufactured, periodic errors thereof need to be at a submicron level; therefore, the manufacturing difficulty is high; (2) in a production process, processing needs to be performed sequentially on two surfaces of the substrate, and therefore the process flow is complex; (3) in the production process, the alignment problem of the micro-lens array and the micro-graphic-text array needs to be solved, and therefore the process controllability is low; and (4) as strict alignment between the micro-graphic-text array and the micro-lens array cannot be ensured in the production process, some anti-counterfeiting effects cannot meet expectations or even cannot be achieved.

That is to say, the optical anti-counterfeiting element in the related art has the problem of low yield.

SUMMARY

A main object of the disclosure is to provide an optical anti-counterfeiting element and an optical anti-counterfeiting product, so as to solve the problem in the related art that the optical anti-counterfeiting element has a low yield.

In an embodiment of the disclosure, an optical anti-counterfeiting element is provided, including: a substrate; and a plurality of reflective mirror segments, wherein each of the plurality of the reflective mirror segments is arranged on one side surface of the substrate according to a preset rule, the plurality of reflective mirror segments are arranged at intervals and two adjacent reflective mirror segments form a gap, and the plurality of reflective mirror segments and/or the gap provide pixels of macroscopic images, thereby forming macroscopic dynamic images and stereoscopic images.

In an embodiment, a thickness of each of the plurality of reflective mirror segments is less than or equal to 1 micron.

In an embodiment, the gap penetrates at least in a first dimension in a plane, and in a second dimension perpendicular to the first dimension, a width of the gap is greater than 1 micron and less than 100 microns.

In an embodiment, a side surface, away from the substrate, of each of the plurality of reflective mirror segments is a plane or a curved surface.

In an embodiment, a longitudinal section of each of the plurality of reflective mirror segments includes at least one of a circle, an ellipse, a polygon, a sawtooth shape, a parabola shape and a sine shape; and/or the plurality of reflective mirror segments is arranged periodically or aperiodically; and/or each of the plurality of reflective mirror segments is of a two-dimensional structure or a three-dimensional structure.

In an embodiment, at least a part of the plurality of reflective mirror segments is provided with a structural layer, the structural layer homomorphically covers a side surface, away from the substrate, of each of the at least a part of the plurality of reflective mirror segments, and provides light of a preset color in a direction of reflected light.

In an embodiment, the structural layer includes: a micro-structural layer, the micro-structural layer has a plurality of micro-structures, and the plurality of micro-structures homomorphically cover on the side surface, away from the substrate, of each of the at least a part of the plurality of reflective mirror segments; and a coating layer, the coating layer is provided on a side of the micro-structural layer away from each of the at least a part of the plurality of reflective mirror segments.

In an embodiment, each of the plurality of micro-structure includes at least one of a micro-structure with a steep side wall and a submicron structure.

In an embodiment, when each of the plurality of micro-structure includes the submicron structure, the submicron structure is a one-dimensional structure or a two-dimensional structure.

In an embodiment, the coating layer includes a single-layer coating layer or a multilayer coating layer.

In an embodiment, the coating layer includes one of a coating layer formed by stacking at least one metal coating layer and at least one dielectric coating layer, a single-layer metal coating layer, a single-layer dielectric coating layer, a multilayer metal coating layer and a multilayer dielectric coating layer.

In an embodiment, the at least one dielectric coating layer includes one of a low-refractive-index dielectric layer and a high-refractive-index dielectric layer.

In an embodiment, the structural layer provides a structural color.

In an embodiment, the gap is filled with a micro-relief structure, and the micro-relief structure forms an image having a second optical feature.

In an embodiment, the micro-relief structure includes a sub-wavelength grating, wherein a period of the sub-wavelength grating is greater than 0.2 microns and less than 0.7 microns.

In an embodiment, the sub-wavelength grating is a one-dimensional structure or a two-dimensional structure.

In an embodiment, a coating film is provided on a side surface of the micro-relief structure away from the substrate.

In an embodiment, the coating film includes a single-layer coating film or a multilayer coating film.

In an embodiment, the coating film includes one of a single-layer metal coating film, a single-layer dielectric coating film, a multilayer metal coating film, a multilayer dielectric coating film, and a coating film formed by stacking at least one metal coating film and at least one dielectric coating film.

In an embodiment, the at least one dielectric coating film includes one of a low-refractive-index dielectric film and a high-refractive-index dielectric film.

In an embodiment, the micro-relief structure provides optical reflection and diffraction images, and the micro-relief structure forms dynamic and stereoscopic images; and/or the micro-relief structure includes at least one of a diffraction grating, a blazed grating and a random scattering structure.

In an embodiment, a period of the diffraction grating is greater than 0.5 microns and less than 5 microns; and/or a period of the blazed diffraction grating is greater than 3 microns and less than 30 microns.

In an embodiment, each of the plurality of reflective mirror segments further includes at least one of a diffractive optically variable feature, an interference optically variable feature, a micro-nano structural feature, a printing feature, a partially metallized feature, a fluorescent feature, and a structure of magnetic, optical, electrical and radioactive features for machine reading; and/or the substrate includes one of a colored thin film or a colorless thin film formed by one material among polyethylene terephthalate, polyvinyl chloride, polyethylene, polycarbonate, polypropylene, metal, glass and paper.

In another embodiment of the disclosure, an optical anti-counterfeiting product is provided, the optical anti-counterfeiting product including the described optical anti-counterfeiting element.

By applying the technical solution of the disclosure, the optical anti-counterfeiting element includes a substrate and a plurality of reflective mirror segments; each of the plurality of reflective mirror segments is arranged on one side surface of the substrate according to a preset rule, the plurality of reflective mirror segments are arranged at intervals and two adjacent reflective mirror segments form a gap, and the plurality of reflective mirror segments or the gap or the plurality of reflective mirror segments and the gap together provide pixels of macroscopic images, thereby forming macroscopic dynamic images and stereoscopic images.

By providing the plurality of reflective mirror segments on one side surface of the substrate, incident rays reaching the optical anti-counterfeiting element may be reflected by the plurality of reflective mirror segments to enter human eyes; while the gap formed by the plurality of reflective mirror segments arranged at intervals have a weak reflection effect on the light rays, so that pixels provided by the plurality of reflective mirror segments and the gap have bright and dark optical feature differences during observation. In addition, each of the plurality of reflective mirror segments is arranged according to a preset rule, so that the pixels from which brightness differences are observed form a preset macroscopic image, and anti-counterfeiting information is provided. The optical anti-counterfeiting element of the disclosure is able to be used in high-security products such as banknotes, credit cards, passports and securities as well as other high-value-added products.

BRIEF DESCRIPTION OF THE DRAWINGS

The drawings of the description, constituting a part of some embodiments of the disclosure, are used for providing further understanding of some embodiments of the disclosure, and the embodiments of the disclosure and illustrations thereof are used to explain the disclosure, rather than constitute inappropriate limitation on the disclosure. In the drawings.

Figure 1:
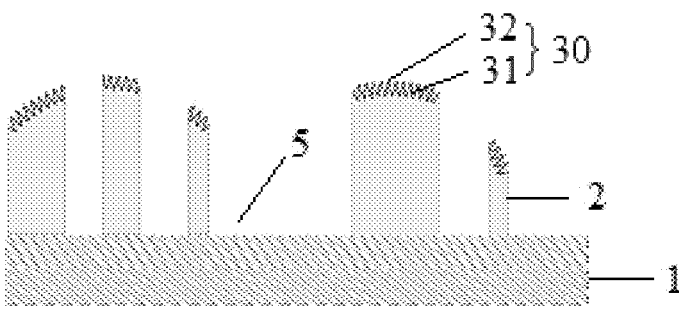
FIG. 1 shows a longitudinal sectional view of an optical anti-counterfeiting element according to Embodiment I of the disclosure.

The figures above include the following reference signs:
1. Substrate; 2. Reflective mirror segment; 30. Structural layer; 31. Micro-structural layer; 32. Coating layer; 40. Micro-relief structure; 41. Coating film; 5. Gap.

DETAILED DESCRIPTION OF THE EMBODIMENTS

It is to be noted that embodiments in the disclosure and features in the embodiments may be combined with one another without conflicts. Hereinafter, some embodiments of the disclosure are described in detail with reference to the accompanying drawings and in conjunction with the embodiments.

It is to be noted that unless otherwise indicated, all technical and scientific terms used in some embodiments of the disclosure have the same meanings as those commonly understood by a person of ordinary skill in the art to which the disclosure belongs.

In some embodiments of the disclosure, unless specified to the contrary, directional terms such as "upper, lower, top and bottom" are generally used regarding the directions shown in the figures, or for the components themselves in vertical, perpendicular or gravity directions; likewise, for ease of understanding and description, "internal, external" refer to internal and external relative to the outline of each component itself, but the described directional terms are not used to limit some embodiments of the disclosure.

In order to solve the problem in the related art that an optical anti-counterfeiting element has a low yield, some embodiments of the disclosure provide an optical anti-counterfeiting element and an optical anti-counterfeiting product. reflective mirror segments 2 are provided according to a preset rule, so that the reflective mirror segments 2 or gap 5 provide pixels of macroscopic images, thereby forming macroscopic dynamic images and stereoscopic images.

As shown in FIGS. 1-11, the optical anti-counterfeiting element includes a substrate 1 and a plurality of reflective mirror segments 2; each of the plurality of reflective mirror segments 2 is arranged on one side surface of the substrate 1 according to a preset rule, and the plurality of reflective mirror segments 2 are arranged at intervals and two adjacent reflective mirror segments form a gap 5; pixels of the macroscopic image are able to be provided by the plurality of reflective mirror segments 2 alone, the pixels of the macroscopic image may also be provided by the gap 5 alone, and the pixels of the macroscopic image may also be provided by the plurality of reflective mirror segments 2 and the gap 5 together, thereby forming macroscopic dynamic images and stereoscopic images.

By providing the plurality of reflective mirror segments 2 on one side surface of the substrate 1, incident rays reaching the optical anti-counterfeiting element is able to be reflected by the plurality of reflective mirror segments 2 to enter human eyes; while gaps 5 formed by the plurality of reflective mirror segments 2 arranged at intervals have a weak reflection effect on the light rays, so that pixels provided by the plurality of reflective mirror segments 2 and the gap 5 have bright and dark optical feature differences during observation. In addition, each of the plurality of reflective mirror segments 2 is arranged according to the preset rule, so that pixels from which brightness differences are observed form a preset macroscopic image, and anti-counterfeiting information is provided.

It should be noted that, each of the plurality of reflective mirror segments 2 is arranged according to the preset rule, means that each of the plurality of reflective mirror segments 2 is arranged according to a preset pattern.

It should be noted that, when a certain part of the plurality of reflective mirror segments 2 or a certain part of the gaps 5 provides the pixels of the macroscopic image, the rest part of the plurality of reflective mirror segments 2 or the rest part of the gaps 5 serves as a background to provide a brightness feature. Specifically, by providing each of the plurality of reflective mirror segments 2 according to the preset rule, the pixels of the macroscopic image may be provided by the plurality of reflective mirror segment 2, and at this time, the gaps 5 provide background pixels, that is to say, a macroscopic image with high brightness and a background with low brightness are obtained when observing by human eyes. Certainly, the pixels of the macroscopic image may also be provided by the gaps 5, and at this time, the plurality of reflective mirror segments 2 provide background pixels, that is, when observed by human eyes, the macroscopic image has dark brightness, and the background presents an optical feature of a high brightness. Of course, the pixels of the macroscopic image may also be provided by a certain part of the plurality of reflective mirror segments 2 and a certain part of the gaps 5 ether, and at this time, the macroscopic image observed has the feature of alternate bright and dark distribution, and at the same time, another part of the plurality of reflective mirror segments 2 and another part of the gap 5 which do not provide pixels of the macroscopic image will provide a background of alternate bright and dark distribution.

In addition, the macroscopic image is a combination of one or more images, and each image corresponds to an incident angle of one light source, when there are a plurality of light sources in an environment, a plurality of reflected images appear; however, only one of the reflected images is an original image at a preset position, remaining images of the reflected images are negative superposition of the original image, that is to say, the remaining images of the reflected images will cause blurring of the original image when observing by human eyes, thereby reducing the definition and contrast of the original image.

Specifically, an optical effect presented by the dynamic images and the stereoscopic images formed by the optical anti-counterfeiting element includes any one of translation, double-channel, multi-channel, animation and stereoscopic. In order to obtain the dynamic images and stereoscopic images, each of the reflective mirror segments 2 need to be arranged according to the preset rule, that is, a micro-graphic-text array corresponding to the macroscopic image on the optical anti-counterfeiting element needs to be designed, and a design method for the micro-graphic-text array is divided into the following three steps:

1) macroscopic images $F(\theta i, \varphi j)$ seen at various observation angles are determined, where $\theta$ and $\varphi$ are respectively an inclination angle of a frame of image rotating on a y-axis and an inclination angle of the frame of image rotating on an x-axis, and i and j are respectively serial numbers of animation frames rotating on the y-axis and rotating on the x-axis of the frame of image, and the ranges of i and j are set to be 1, 2, 3, . . . , M. That is, M frames are taken in each of x and y directions, and the total number of frames is M*M frames.

2) Each of the macroscopic images $F(\theta i, \varphi j)$ is pixelized according to its actual size and a size of a micro-sampling tool, wherein each pixel corresponds to one micro-sampling tool. For example, assuming that each of the macroscopic images is a square, a side length thereof is L, and a spacing between two micro-sampling tools is p, then a number of micro-sampling tools included in the length of L is N=L/p. By scaling each of the macroscopic images $F(\theta i, \varphi j)$ to N*N pixels, each of the N*N pixels is able to correspond to one micro-sampling tool.

3) According to each of the various observation angles, each pixel is projected to a micro-graphic-text region corresponding to the micro-sampling tool. After traversing all of the macroscopic images and all of the micro-sampling tools, the design of the micro-graphic-text array is completed.

According to the design method for the micro-graphic-text array described above, reflective mirror segments 2 or gaps 5 which contribute to the macroscopic images at all positions in a space can be designed, wherein each reflective mirror segment 2 or gap 5 contains one or more pixels.

In an embodiment, a thickness of each of the plurality of reflective mirror segments 2 is less than or equal to 1 micron. The thickness of each of the plurality of reflective mirror segments 2 being less than or equal to 1 micron is easier to implement in a product process, and a plurality of reflective mirror segments 2 are also able to be integrated to achieve integration of a plurality of optical feature effects. Moreover, a small thickness of each of the plurality of reflective mirror segments 2 facilitates increasing the definition of the macroscopic images, as a reflective mirror segment 2 with small thickness is able to limit the angles of reflected light and incident light rays within a small range; only one, at most several, light sources are able to generally be provided in such a small range of limited space, the problem of image blurring occurring when observing the macroscopic images under an environment of irradiation by multiple light sources is avoided, ensuring anti-counterfeiting information to be clear and easy to recognize. That is to say, light emitted by only one, at most several light sources are able to be reflected on the plurality of reflective mirror segments 2.

In an embodiment, the gap 5 penetrates at least in a first dimension in a plane, and in a second dimension perpendicular to the first dimension, a width of the gap 5 is greater than 1 micron and less than 100 microns. The gap 5 penetrates at least in the first dimension in the plane, which is beneficial for controlling a reflection direction of light rays, and avoids the effect of stray light rays on the recognition of anti-counterfeiting information; in addition, the gap 5 is able to eliminate the effect of ghost images generated by the multiple light sources, so that the macroscopic images have a high contrast, and it is ensured that the anti-counterfeiting information is clear and easily recognizable. By controlling the width of the gap 5 to be greater than 1 micro, the light rays are prevented from being excessively reflected due to a narrow width of the gap 5, so that the brightness of the optical anti-counterfeiting element is excessively high, thereby avoiding affecting the observation of the anti-counterfeiting information by human eyes. By controlling the width of the gap 5 to be less than 100 microns, too many dark regions with low brightness are avoided, which affects the recognition of the anti-counterfeiting information. In addition, setting the width of the gap 5 within a reasonable range also facilitates the pixelization of the macroscopic images, and facilitates rational design of the preset rule for arranging of the reflective mirror segments 2.

In an embodiment, each of the plurality of reflective mirror segments 2 is formed by a cylindrical lens.

In an embodiment, a side surface, away from the substrate 1, of each of the plurality of reflective mirror segments 2 is a plane or a curved surface. As the function of the plurality of reflective mirror segments 2 is to reflect light rays into human eyes, the morphology of the side surface, away from the substrate 1, of each of the plurality of reflective mirror segments 2 is smooth and continuous, thereby preventing stray scattered light rays from affecting recognition of the anti-counterfeiting information. When the side surface, away from the substrate 1, of each of the plurality of reflective mirror segments is the plane, the reflective effect of each of the plurality of reflective mirror segments 2 on light rays is more concentrated, and the brightness of a picture presented by the reflective mirror segment 2 is higher. In another embodiment, the side surface, away from the substrate 1, of each of the plurality of reflective mirror segments is a curved surface.

It should be noted that, compared with the curved surface, when the side surface, away from the substrate 1, of each of the plurality of reflective mirror segments is the plane, the requirement for a mask-making technology is more strict, otherwise, a scattering situation may occur on each of the plurality of reflective mirror segments 2, which causes that when the optical anti-counterfeiting element is observed under of the multiple light sources, a superposition of multiple frames of images causes the macroscopic images to be unclear, thereby affecting the recognition of the anti-counterfeiting information. In another embodiment, the side surface, away from the substrate 1, of each of the plurality of reflective mirror segments is a curved surface.

In an embodiment, a longitudinal section of each of the plurality of reflective mirror segments 2 includes at least one of a circle, an ellipse, a polygon, a sawtooth shape, a parabola shape and a sine shape. By setting longitudinal sections of each of the plurality of reflective mirror segments 2 to have different shapes, that is, by setting different structures of each of the plurality of reflective mirror segments 2, macroscopic images are able to be selected more abundantly and anti-counterfeiting information is able to be designed more abundantly, thereby improving anti-counterfeiting characteristics of the optical anti-counterfeiting element.

In an embodiment, the plurality of reflective mirror segments 2 is arranged periodically or aperiodically. In an embodiment, each of the plurality of reflective mirror segments 2 is selected from concave and convex reflective mirrors, and an arrangement rule of the concave and convex reflective mirrors is preset, and may be a periodic arrangement or an aperiodic arrangement. In an embodiment, reflective mirrors are arranged in a rectangular manner, an arrangement period is greater than 20 microns and less than 150 microns, and the reflective mirrors are arranged in a one-dimensional or two-dimensional manner along any axis of symmetry of the substrate 1. When the reflective mirrors are arranged in the one-dimensional manner along a certain direction, the reflective mirrors used extend infinitely in a direction perpendicular to the axis of symmetry.

In an embodiment, each of the plurality of reflective mirror segments 2 has a two-dimensional structure or a three-dimensional structure. By setting each of the plurality of reflective mirror segments 2 as a two-dimensional or three-dimensional structure, the direction of reflected light is able to be controlled more flexibly, more abundant anti-counterfeiting information is designed, and anti-counterfeiting characteristics of the optical anti-counterfeiting element are improved.

It should be noted that the two-dimensional structure may be a flat step. By controlling a spacing distance between flat steps to match the pupil distance of human eyes, reflected images observed by the human eyes at different observation angles are achieved, which is somewhat similar to early 3D movies, in which a 3D movie is formed by adding a narrow grating in front of a screen.

In an embodiment, at least a part of the plurality of reflective mirror segments 2 is provided with a structural layer 30, the structural layer 30 homomorphically covers a side surface, away from the substrate 1, of each of the at least a part of the plurality of reflective mirror segments 2, and provides light of a preset color in a direction of reflected light. By providing the structural layer 30 on the at least the part of the plurality of reflective mirror segments 2, light of a specific color is able to be reflected, and therefore anti-counterfeiting information having bright-dark features and color features is able to be observed in environments of a point light source or natural light, thereby improving the anti-counterfeiting characteristics of the optical anti-counterfeiting element.

In an embodiment, the structural layer 30 includes a micro-structural layer 31 and a coating layer 32. The micro-structural layer 31 has a plurality of micro-structures, and the plurality of micro-structures homomorphically cover on the side surface, away from the substrate 1, of each of the at least a part of the plurality of reflective mirror segments 2; and the coating layer 32 is provided on a side of the micro-structural layer 31 away from each of the at least a part of the plurality of reflective mirror segments 2. By cooperation between the micro-structural layer 31 and the coating layer 32, reflected light is able to present a preset color feature, and also, the micro-structural layer 31 and the coating layer 32 are able to cooperate with the plurality of reflective mirror segments 2, that is, a macroscopic image or background with a high brightness also has a color feature, facilitating recognition of the anti-counterfeiting information, and improving the anti-counterfeiting characteristics of the optical anti-counterfeiting element.

In an embodiment, each of the plurality of micro-structure includes at least one of a micro-structure with a steep side wall and a submicron structure. Providing different structural features of each of the plurality of micro-structures is able to control the direction of reflected light more flexibly, and at the same time, the color of the reflected light is modulated in cooperation with the coating layer 32, thereby facilitating designing more abundant anti-counterfeiting information.

It should be noted that, the micro-structure with the steep side wall refers to a micro-structure having a side wall in a vertical direction, such as a micro-structure with a rectangular longitudinal section.

It should be noted that, the groove shape of the submicron structure may be sine-shaped or sawtooth-shaped. The submicron structure is a structure with a feature size less than 1 micron, and the optical anti-counterfeiting element may be assembly or combination of various submicron structures.

In an embodiment, when each of the plurality of micro-structures includes the submicron structure, the submicron structure is a one-dimensional structure or a two-dimensional structure. By selecting different submicron structures, the direction of reflected light is flexibly controlled, and the color of the reflected light is modulated in cooperation with the coating layer 32, thereby facilitating designing more abundant anti-counterfeiting information.

It should be noted that, when the submicron structure is a two-dimensional structure, a period of the submicron structure is variable, and the period in the x-direction or the y-direction or in the x-direction and the y-direction (i.e. a transverse feature size) is greater than 50 nanometers and less than 700 nanometers. In an embodiment, the period of the submicron structure is greater than 200 nanometers and less than 400 nanometers; the trench depth of the submicron structure is greater than 10 nanometers and less than 500 nanometers. In another embodiment, a trench depth of the submicron structure is greater than 50 nanometers and less than 200 nanometers.

In an embodiment, the submicron structure may be selected as a one-dimensional grating or a two-dimensional grating, and a grating distribution of the two-dimensional grating may be an orthogonal structure, a honeycomb structure, a two-dimensional Bragg lattice structure, a random structure, etc. Preferably, the submicron structure is a two-dimensional grating.

In an embodiment, the coating layer 32 includes a single-layer coating layer or a multilayer coating layer. The provision of the single-layer coating layer facilitates the coating layer 32 to be plated on the micro-structural layer 31. The multilayer coating layer is able to better absorb and reflect incident light rays, but process plating of the multilayer coating layer is more difficult.

In an embodiment, the coating layer 32 includes one of a coating layer formed by stacking at least one metal coating layer and at least one dielectric coating layer, a single-layer metal coating layer, a single-layer dielectric coating layer, a multilayer metal coating layer and a multilayer dielectric coating layer.

The material of the metal coating layer may be at least one of metals such as gold, silver, copper, aluminum, iron, tin, zinc, nickel and chromium. The material of the dielectric coating layer may be at least one of materials such as $MgF_2$, $SiO_2$, $Al_2O_3$, MgO, PMMA (polymethyl methacrylate), $TiO_2$, ZnS, ZnO, and the like.

In an embodiment, the dielectric coating layer includes one of a low-refractive-index dielectric layer and a high-refractive-index dielectric layer. The material of the high-refractive-index dielectric layer is a dielectric material having a refractive index higher than 1.7, and the material of the low-refractive-index dielectric layer is a material having a refractive index less than or equal to 1.7.

It should be noted that, the multilayer dielectric coating layer usually uses a stacking manner of a high-refractive-index dielectric layer, a low-refractive-index dielectric layer and a high-refractive-index dielectric layer.

It should be noted that, the coating layer 32 may also be selected as a Fabry-Perot interferometer, so as to precisely control the color of reflected light.

In particular, the structural layer 30 provides a structural color. The structural color is able to display more abundant anti-counterfeiting information, thereby improving anti-counterfeiting characteristics of the optical anti-counterfeiting element.

It should be noted that, the structural color is irrelevant to pigmentation, and is an optical effect caused by sub-microscopic structures. The structural layer 30 providing the structural color means that the structural layer 30 is able to produce an optical effect of the structural color.

In an embodiment, the gap 5 is filled with a micro-relief structure 40, and the micro-relief structure 40 forms an image having a second optical feature. The arrangement of the micro-relief structure 40 increases the space utilization rate of the optical anti-counterfeiting element, so that the anti-counterfeiting information provided at the gap 5 is more abundant, and the image having the second optical feature also facilitates observation and recognition of the anti-counterfeiting information; however, the arrangement of the micro-relief structure 40 also increases the difficulty of process manufacturing.

In an embodiment, the micro-relief structure 40 includes a sub-wavelength grating, wherein a period of the sub-wavelength grating is greater than 0.2 microns and less than 0.7 microns. In an embodiment, the sub-wavelength grating has a one-dimensional structure or a two-dimensional structure.

It should be noted that the period of the sub-wavelength grating is less than 1 micron.

In an embodiment, a coating film 41 is provided on a side surface, away from the substrate 1, of the micro-relief structure 40. Cooperation between the micro-relief structure 40 and the coating film 41 enables reflected light to have a color feature, that is, light rays reflected by the micro-relief structure 40 and the coating film 41 are able to form the image having the second optical feature, thereby enriching the anti-counterfeiting information of the optical anti-counterfeiting element and improving the anti-counterfeiting characteristics of the optical anti-counterfeiting element.

In an embodiment, the coating film 41 and the coating layer 32 are formed in the same process, that is to say, the coating film 41 and the coating layer 32 are made of the same material and plated on the optical anti-counterfeiting element at the same time. In another embodiment, materials of the coating film 41 and the coating layer 32 are different, and the coating film 41 and the coating layer 32 are plated separately.

In an embodiment, the coating film 41 includes a single-layer coating film or a multilayer coating film. The arrangement of the single-layer coating film facilitates the coating film 41 to be plated on the micro-relief structure 40. The multilayer coating film is able to better absorb and reflect incident light rays, but process coating of the multilayer coating film will be more cumbersome.

In an embodiment, the coating film 41 includes one of a single-layer metal coating film, a single-layer dielectric coating film, a multilayer metal coating film, a multilayer dielectric coating film, and a coating film formed by stacking at least one metal coating film and at least one dielectric coating film.

The material of the metal coating film may be at least one of metals such as gold, silver, copper, aluminum, iron, tin, zinc, nickel and chromium. The material of the dielectric coating film may be at least one of materials such as $MgF_2$, $SiO_2$, $Al_2O_3$, MgO, PMMA, $TiO_2$, ZnS, ZnO and the like.

In an embodiment, the at least one dielectric coating film includes one of a low-refractive-index dielectric film and a high-refractive-index dielectric film. The material of the high-refractive-index dielectric film is a dielectric material having a refractive index higher than 1.7, and the material of the low-refractive-index dielectric film is a material having a refractive index less than or equal to 1.7.

It should be noted that, the coating film 41 may also be selected as a Fabry-Perot interferometer, so as to precisely control the color of reflected light.

In an embodiment, the micro-relief structure 40 provides optical reflection and diffraction images, and the micro-relief structure forms dynamic and stereoscopic images. In another embodiment, a structural color is also be provided, and the structural color enables the image having the second optical feature to display more abundant anti-counterfeiting information, thereby improving the anti-counterfeiting characteristics of the optical anti-counterfeiting element.

In an embodiment, the micro-relief structure 40 includes at least one of a diffraction grating, a blazed grating and a random scattering structure. By providing different structures of the micro-relief structure 40, the direction of the reflected light is able to be controlled more flexibly, so that the image having the second optical feature contains more abundant anti-counterfeiting information, and anti-counterfeiting characteristics of the optical anti-counterfeiting element are improved.

In an embodiment, a period of the diffraction grating is greater than 0.5 microns and less than 5 microns, and a period of the blazed grating is greater than 3 microns and less than 30 microns.

In an embodiment, each of the plurality of reflective mirror segments 2 further includes at least one of a diffractive optically variable feature, an interference optically variable feature, a micro-nano structural feature, a printing feature, a partially metallized feature, a fluorescent feature, and a structure of magnetic, optical, electrical and radioactive features for machine reading. A user is able to select reflective mirror segments 2 having different optical features according to a required anti-counterfeiting effect, so that more abundant anti-counterfeiting information is able to be acquired, facilitating recognition and observation of the anti-counterfeiting information.

In an embodiment, the substrate 1 includes one of a colored thin film or a colorless thin film formed by one material among polyethylene terephthalate, polyvinyl chloride, polyethylene, polycarbonate, polypropylene, metal, glass and paper.

Embodiment I

Figure 2:
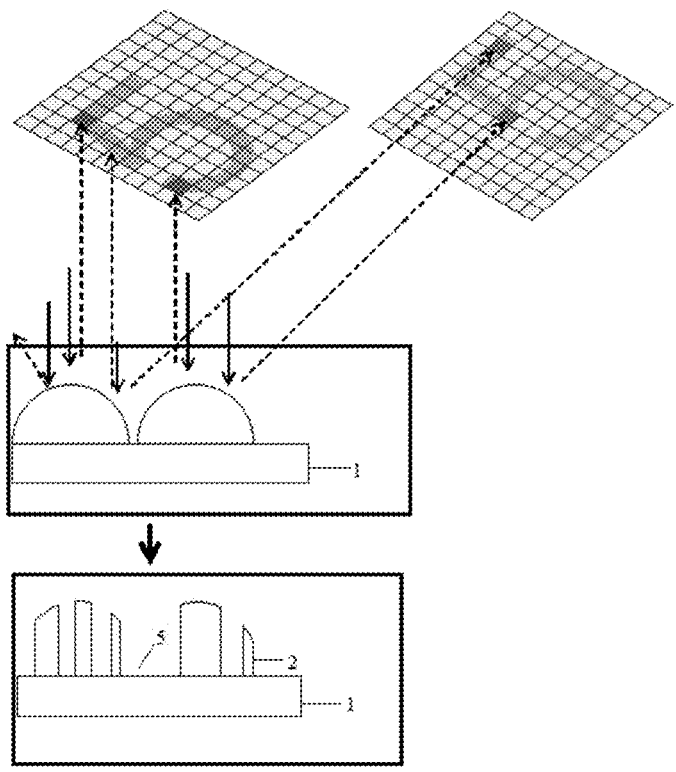
FIG. 2 shows a schematic diagram of a design process of reflective mirror segments according to Embodiment I of the disclosure.
Figure 3:
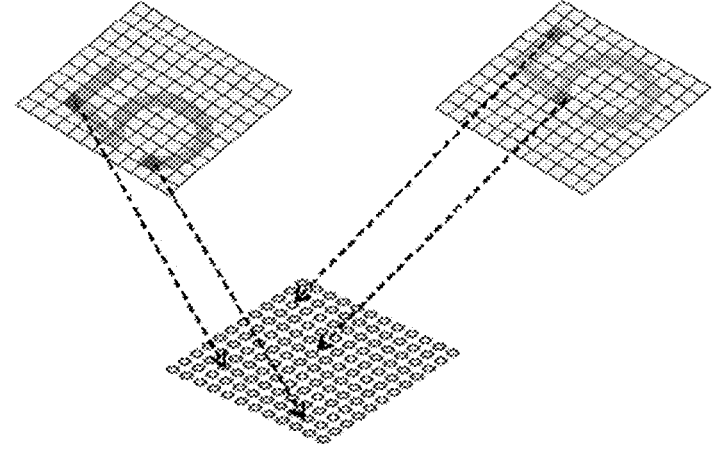
FIG. 3 shows a schematic diagram of a design process of a micro-graphic-text array according to Embodiment I of the disclosure.

As shown in FIGS. 1-3, an optical anti-counterfeiting element includes a substrate 1 and a plurality of reflective mirror segments 2, wherein a structural layer 30 homomorphically covers on at least a part of the plurality of reflective mirror segments 2, the structural layer 30 includes a micro-structural layer 31 and a coating layer 32; the micro-structural layer 31 covers a side surface, away from the substrate 1, of each of the at least a part of the plurality of reflective mirror segments 2, and the coating layer 32 is provided on the side of the micro-structural layer 31 away from the reflective mirror segment 2.

A longitudinal sectional view of the optical anti-counterfeiting element of the present embodiment is as shown in FIG. 1. The plurality of reflective mirror segments 2 and the gap 5 together provide pixels of macroscopic images, and the structural layer 30 modulates the color of reflected light, so as to form macroscopic dynamic images and stereoscopic images having color features.

The left macroscopic image and the right macroscopic image in FIG. 2 are still images of a macroscopic image of number "5" at different observation angles, i.e. two dynamic frames. Pixels of the left macroscopic image of the first frame of the two dynamic frames on the left side are provided by the gap 5, and when an incident direction of light of a light source is perpendicular, emergent direction of light rays is parallel to the incident direction, that is, the gap 5 on the surface of the substrate 1 provide the pixels of the left macroscopic image of the first frame of the two dynamic frames in the perpendicular direction, presenting a dark macroscopic image of number "5" and a background with a high brightness. When the optical anti-counterfeiting element is tilted or rotated, the relative position between the light source and the reflective mirror is changed, a relative incident angle changes, and a position where the light rays exit correspondingly changes, thereby providing a macroscopic image at a different position. i.e. the right macroscopic image of number "5" of the second frame of the two dynamic frames on the right side as shown in FIG. 2, at this time, the pixels in the stroke of the right macroscopic image of number "5" are provided by the reflective mirror segments 2, and background pixels are provided by the gap 5, that is, the right macroscopic image of number "5" with high brightness and a background with low brightness are observed. According to the design process of the micro-graphic-text array as shown in FIG. 3, macroscopic dynamic images and stereoscopic images of the present embodiment are able to be obtained by superposing all frames of images at different observation angles.

Of course, the pixels of the macroscopic images are provided by the reflective mirror segments 2, thereby presenting a macroscopic image of high brightness and a dark background.

It should be noted that, in the embodiment, the plurality of reflective mirror segments 2 are arranged aperiodically. In the design process of the micro-graphic-text array in FIG. 3, the simplest rule of arrangement of reflective mirrors is used, and the reflective mirrors of the disclosure are not limited to a periodic arrangement manner.

In an embodiment, each of the plurality of micro-structures is selected as a two-dimensional submicron structure, a period of the submicron structure is greater than 200 nanometers and less than 400 nanometers, and the trench depth of the submicron structure is greater than 50 nanometers and less than 200 nanometers.

In the embodiment, a coating layer 32 is formed on the micro-structural layer 31 by evaporation or sputtering of a coating material, and the coating layer 32 is a metal coating layer. Therefore, a combination of the structural layer 30 and the reflective mirror segments 2 are able to form plasma reflective mirror segments. By using plasma resonance absorption characteristics of the plasma reflective mirror segments, reflected light present a specific color feature, that is, the macroscopic image or the background presents a specific color feature.

A preset thickness of the coating layer 32 is less than 50 nanometers. In an embodiment, the thickness of the coating layer 32 is less than 20 nanometers.

In an embodiment, the coating layer 32 is an aluminum layer formed by evaporation, and the thickness of the coating layer 32 is 30 nanometers.

It should be noted that, a dielectric coating layer may also be evaporated when the coating layer 32 is plated, and in an embodiment, the dielectric coating layer adopts $SiO_2$, and after three layers of the coating layer 32 are evaporated, the color of the presented light changes from red to green. When the side surface, away from the substrate 1, of each of the plurality of reflective mirror segments 2 is a plane, that is, the color of regions without micro-structures on the plurality of reflective mirror segments 2 is fixed, the light color changes along with the change of an observation angle, and the color of the presented light changes from yellow to green.

It should be noted that regions with two-dimensional grating and regions with no two-dimensional grating may exist on the substrate 1 due to existence of the micro-structural layer 31.

Embodiment II

This embodiment differs from Embodiment I in that: in the embodiment, the plurality of reflective mirror segments 2 is removed.

Figure 4:
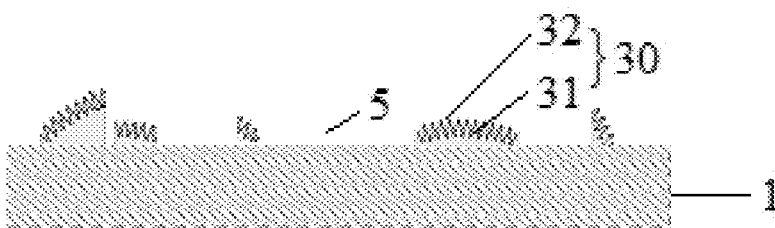
FIG. 4 shows a longitudinal sectional view of an optical anti-counterfeiting element according to Embodiment II of the disclosure.

As shown in FIG. 4, the columnar heights of the plurality of reflective mirror segments 2 on the surface of the substrate 1 disappear, and the structural layers 30 provide all pixels required in a macroscopic image, thereby forming curved-surface blazed gratings.

It should be noted that the columnar heights of the plurality of reflective mirror segments 2 have no reflection effect, and the columnar heights of the plurality of reflective mirror segments 2 are removed, only a change trend of the morphology is maintained, and the angle of emergent light is not changed; however, the position of emergent light will be effected, and a translation position thereof needs to be recalculated, otherwise, a preset macroscopic image may not be presented.

It should be noted that the arrangement rule of the plurality of reflective mirror segments 2 may not be simply and directly taken from concave mirrors and convex mirrors, and the translation positions of the plurality of reflective mirror segments need to be calculated for rearrangement, and in this way, the preset macroscopic image is be obtained.

All the embodiments in Embodiment III to Embodiment VIII are able to be designed according to the calculation rule, to obtain embodiments having no columnar height of the plurality of reflective mirror segments 2, which will not be illustrated one by one by drawing in some embodiments of the disclosure.

Embodiment III

Figure 5:
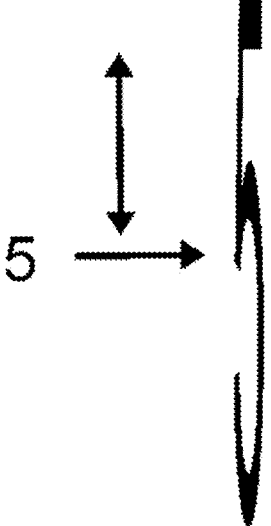
FIG. 5 shows a macroscopic image conversion manner according to embodiment III of the disclosure.
Figure 6:
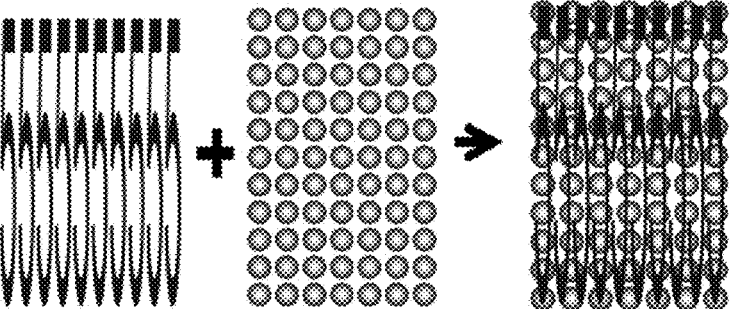
FIG. 6 shows a schematic diagram of a design process of a micro-graphic-text array according to Embodiment III of the disclosure.

As shown in FIGS. 5-6, in the embodiment, the micro-graphic-text array is a cylindrical graphic-text array, i.e. a two-dimensional micro-graphic-text array in which a number "5" extends infinitely along a certain symmetry axis direction of the reflective mirror, and the cylindrical graphic-text array is embedded in a curved lens array. The arrangement manner is as shown in FIG. 6.

As shown in FIG. 5, the width of the macroscopic image of number "5" in a horizontal direction is unchanged, and is stretched in a perpendicular direction; and the stretching length is a macroscopic size, and is consistent with the size of an actual optical effect.

It should be noted that, when a two-dimensional micro-graphic-text arrangement manner is adopted, the micro-graphic-text arrangement manner is consistent with that of a curved mirror, and only the graphic-text period and angle slightly change microscopically. In addition, the two-dimensional micro-graphic-text arrangement manner has requirements for an observation light source, and under the condition of a point light source, the observed optical effect is the best. When there are a plurality of light sources in an environment, a plurality of images will be formed, and the plurality of images are displayed in an overlapping manner, so that the observed macroscopic image is blurred. The arrangement manner of the columnar graphic-text array used in the embodiment has an amplification effect only in one direction, and the other direction, i.e. the direction in which the micro-graphic-text extends infinitely, is not affected by the observation light source, so that the macroscopic dynamic images and stereoscopic images during observation are clearer and variable.

In an embodiment, the period of the curved lens array is greater than 5 microns and less than 200 microns. The period of the reflective mirror segments 2 is greater than 5 microns and less than 200 microns. In an embodiment, the arrangement period of the columnar graphic-text array is greater than 5 microns and less than 200 microns, and the width of micro-graphic-text lines is greater than 0.2 microns and less than 100 microns. In the present embodiment, the period of the curved lens array is 25 microns, the arrangement period of the columnar graphic-text array is 24.9 microns, and the width of the micro-graphic-text lines is 2 microns.

Embodiment IV

The embodiment differs from Embodiment I in that: the side surface, away from the substrate 1, of each of the plurality of reflective mirror segments 2 is a plane. That is to say, the plurality of reflective mirror segments 2 are taken from a planar prism.

Figure 7:
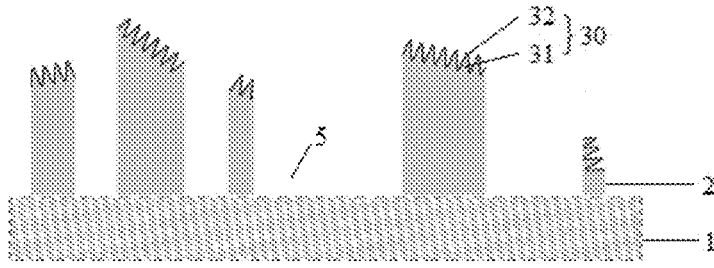
FIG. 7 shows a longitudinal sectional view of an optical anti-counterfeiting element according to Embodiment IV of the disclosure.

As shown in FIG. 7, the side surface, away from the substrate 1, of each of the plurality of reflective mirror segments 2 is a smooth inclined surface without curvature change.

It should be noted that, when each of the plurality of reflective mirror segments 2 is taken from the prism, as the size of each of the plurality of reflective mirror segments 2 is large, the occurrence of a diffraction situation is basically avoided, and therefore, a Fresnel reflection formula and a Fresnel transmission formula are satisfied when a plane wave is incident. The inclination angle and azimuth angle of each of the plurality of reflective mirror segments 2 are determined by the Fresnel formulas, and according to the designed inclination angle and azimuth angle, each of the plurality of reflective mirror segments 2 presents one pixel; multiple groups of the plurality of reflective mirror segments 2 are arranged according to a specific arrangement rule, and the multiple groups of the plurality of reflective mirror segments 2 satisfy the same Fresnel formula, and present macroscopic graphic-text information. All of the plurality of reflective mirror segments 2 arranged according to a specific rule present macroscopic dynamic images and stereoscopic images.

In an embodiment, the period of the plurality of reflective mirror segments 2 is greater than 3 microns and less than 30 microns.

In an embodiment, the coating layer 32 is a three-layer coating layer formed by evaporation, the material of an intermediate coating layer is SiO$_2$, and the color of presented light changes from yellow to green.

Embodiment V

The embodiment differs from Embodiment I in that: the structures of the plurality of reflective mirror segments 2 are different.

In the embodiment, each of the plurality of reflective mirror segments 2 is taken from a curved prism of which the side surface away from the substrate 1 is a concave surface.

Figure 8:
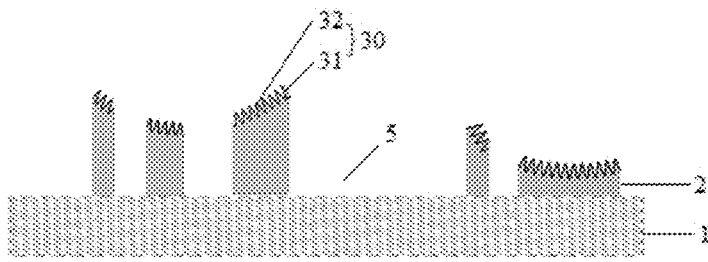
FIG. 8 shows a longitudinal sectional view of an optical anti-counterfeiting element according to Embodiment V of the disclosure.

A longitudinal sectional view of the optical anti-counterfeiting element is as shown in FIG. 8. In the embodiment, the side surface, away from the substrate 1, of each of the plurality of reflective mirror segments 2 is concave towards the substrate 1.

Embodiment VI

The embodiment differs from Embodiment I in that: the structures of the plurality of reflective mirror segments 2 are different.

In the embodiment, each of the plurality of reflective mirror segments 2 is taken from a curved prism of which the side surface away from the substrate 1 is a convex surface, the gap 5 is filled with a micro-relief structure 40, and the micro-relief structure 40 is provided with a coating film 41. Light rays reflected by the micro-relief structure 40 and the coating film 41 together form an image having a second optical feature containing a color feature.

Figure 9:
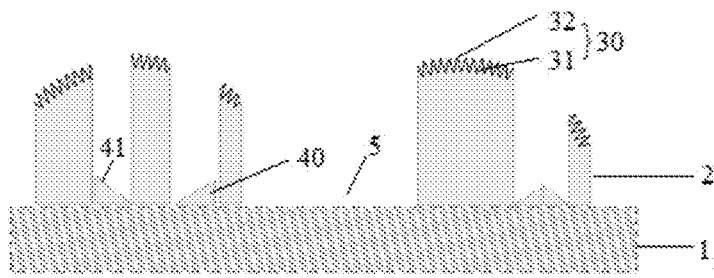
FIG. 9 shows a longitudinal sectional view of an optical anti-counterfeiting element according to Embodiment VI of the disclosure.

As shown in FIG. 9, the micro-relief structure 40 is a blazed grating. In an embodiment, the period of the blazed grating is greater than 5 microns and less than 20 microns.

In an embodiment, the thickness of each of the plurality of reflective mirror segments 2 is less than 1 micron, and the period thereof is greater than 3 microns and less than 30 microns.

Embodiment VII

The embodiment differs from Embodiment VI in that: the structure of the micro-relief structure 40 is different.

Figure 10:
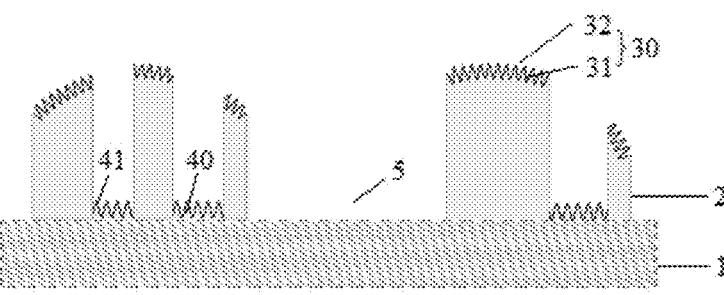
FIG. 10 shows a longitudinal sectional view of an optical anti-counterfeiting element according to Embodiment VII of the disclosure.

In the embodiment, the micro-relief structure 40 is a sub-wavelength grating. A longitudinal sectional view of the optical anti-counterfeiting element is as shown in FIG. 10.

In an embodiment, the thickness of each of the plurality of reflective mirror segments 2 is less than 1 micron, and the period thereof is greater than 3 microns and less than 30 microns.

Embodiment VIII

The embodiment differs from Embodiment VI in that: the structure of the micro-relief structure 40 is different.

Figure 11:
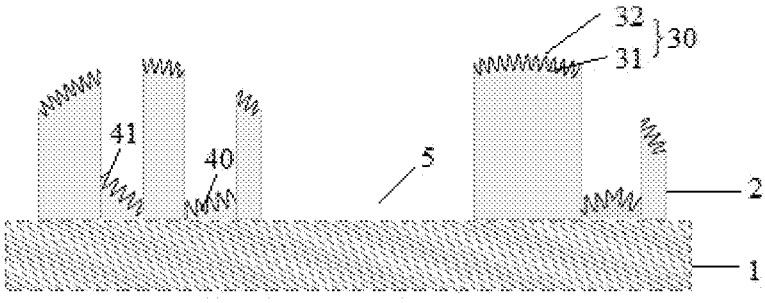
FIG. 11 shows a longitudinal sectional view of an optical anti-counterfeiting element according to Embodiment VIII of the disclosure.

In the embodiment, the micro-relief structure 40 is a combination of a blazed grating and a sub-wavelength grating. A longitudinal sectional view of the optical anti-counterfeiting element is as shown in FIG. 11.

In an embodiment, the thickness of each of the plurality of reflective mirror segments 2 is less than 1 micron, and the period thereof is greater than 3 microns and less than 30 microns.

From the description above, it is determined that the embodiments of the disclosure achieve the following technical effects:

1. The plurality of reflective mirror segments 2 are arranged on one side surface of the substrate 1 according to a preset rule, the plurality of reflective mirror segments 2 are arranged at intervals to form gap 5, and the plurality of reflective mirror segments 2 or the gap 5 or the plurality of reflective mirror segments 2 and the gap 5 together provide pixels of macroscopic images, thereby forming macroscopic dynamic images and stereoscopic images.

2. At least a part of the plurality of reflective mirror segments 2 is provided with a structural layer 30, the structural layer 30 homomorphically covers a side surface, away from the substrate 1, of each of the at least a part of the plurality of reflective mirror segments 2, and provides light of a preset color in the direction of reflected light.

3. The gap 5 is filled with a micro-relief structure 40, and the micro-relief structure 40 forms an image having a second optical feature.

Apparently, the described embodiments are merely a part rather than all of the embodiments of the disclosure. All other embodiments obtained by a person of ordinary skill in the art on the basis of the embodiments in the disclosure without involving any inventive effort shall all fall within the scope of protection of the disclosure.

It should be noted that the terms used herein are for the purpose of describing specific embodiments only and are not intended to limit exemplary embodiments according to the disclosure. As used herein, the singular form is intended to include the plural form as well, unless the context clearly indicates otherwise, and further it should be understood that the terms "includes" and/or "including" when used in the present description, specify the presence of features, steps, operations, devices, assemblies and/or combinations thereof.

It should be noted that the terms "first", "second" etc., in the description, claims, and accompanying drawings of the disclosure are used to distinguish similar objects, and are not necessarily used to describe a specific sequence or order. It should be understood that the data so used may be interchanged where appropriate so that the embodiments of the disclosure described herein may be implemented in sequences other than those illustrated or described herein.

The content above merely relates to preferred embodiments of the disclosure and is not intended to limit some embodiments of the disclosure. For a person skilled in the art, some embodiments of the disclosure may have various modifications and variations. Any modifications, equivalent replacements, improvements, etc. made within the spirit and principle of some embodiments of the disclosure shall all belong to the scope of protection of some embodiments of the disclosure.

What is claimed is:

1. An optical anti-counterfeiting element, comprising:

a substrate; and a plurality of reflective mirror segments, wherein each of the plurality of reflective mirror segments is arranged on one side surface of the substrate according to a preset rule, the plurality of reflective mirror segments are arranged at intervals and two adjacent reflective mirror segments form a gap, and the plurality of reflective mirror segments and/or the gap provide pixels of macroscopic images, thereby forming macroscopic dynamic images and stereoscopic images;

wherein at least a part of the plurality of reflective mirror segments is provided with a structural layer, the structural layer homomorphically covers a side surface, away from the substrate, of each of the at least a part of the plurality of reflective mirror segments, and provides light of a preset color in a direction of reflected light;

wherein the structural layer comprises:

a micro-structural layer, the micro-structural layer has a plurality of micro-structures, and the plurality of micro-structures homomorphically cover on the side surface, away from the substrate, of each of the at least a part of the plurality of reflective mirror segments; and a coating layer, the coating layer is provided on a side of the micro-structural layer away from each of the at least a part of the plurality of reflective mirror segments.

2. The optical anti-counterfeiting element according to claim 1, wherein a thickness of each of the plurality of reflective mirror segments is less than or equal to 1 micron; and/or a side surface, away from the substrate, of each of the plurality of reflective mirror segments is a plane or a curved surface; and/or a longitudinal section of each of the plurality of reflective mirror segments comprises at least one of a circle, an ellipse, a polygon, a sawtooth shape, a parabola shape and a sine shape; and/or the plurality of reflective mirror segments are arranged periodically or aperiodically; and/or each of the plurality of reflective mirror segments is of a two-dimensional structure or a three-dimensional structure; and/or the gap penetrates at least in a first dimension in a plane, and in a second dimension perpendicular to the first dimension, a width of the gap is greater than 1 micron and less than 100 microns; and/or each of the plurality of reflective mirror segments further comprises at least one of a diffractive optically variable feature, an interference optically variable feature, a micro-nano structural feature, a printing feature, a partially metallized feature, a fluorescent feature, and a structure of magnetic, optical, electrical and radioactive features for machine reading; and/or the substrate comprises one of a colored thin film or a colorless thin film formed by one material among polyethylene terephthalate, polyvinyl chloride, polyethylene, polycarbonate, polypropylene, metal, glass and paper.

3. The optical anti-counterfeiting element according to claim 1, wherein each of the plurality of micro-structures comprises at least one of a micro-structure with a steep side wall and a submicron structure.

4. The optical anti-counterfeiting element according to claim 3, wherein when each of the plurality of micro-structures comprises the submicron structure, the submicron structure is a one-dimensional structure or a two-dimensional structure.

5. The optical anti-counterfeiting element according to claim 1, wherein the coating layer comprises a single-layer coating layer or a multilayer coating layer.

6. The optical anti-counterfeiting element according to claim 5, wherein the coating layer comprises one of a coating layer formed by stacking at least one metal coating layer and at least one dielectric coating layer, a single-layer metal coating layer, a single-layer dielectric coating layer, a multilayer metal coating layer and a multilayer dielectric coating layer.

7. The optical anti-counterfeiting element according to claim 6, wherein the at least one dielectric coating layer comprises one of a low-refractive-index dielectric layer and a high-refractive-index dielectric layer.

8. The optical anti-counterfeiting element according to claim 1, wherein the structural layer provides a structural color.

9. The optical anti-counterfeiting element according to claim 1, wherein the gap is filled with a micro-relief structure, and the micro-relief structure forms an image having a second optical feature.

10. The optical anti-counterfeiting element according to claim 9, wherein the micro-relief structure comprises a sub-wavelength grating, wherein a period of the sub-wavelength grating is greater than 0.2 microns and less than 0.7 microns.

11. The optical anti-counterfeiting element according to claim 10, wherein the sub-wavelength grating is a one-dimensional structure or a two-dimensional structure.

12. The optical anti-counterfeiting element according to claim 9, wherein a coating film is provided on a side surface, away from the substrate, of the micro-relief structure.

13. The optical anti-counterfeiting element according to claim 12, wherein the coating film comprises a single-layer coating film or a multilayer coating film.

14. The optical anti-counterfeiting element according to claim 13, wherein the coating film comprises one of a single-layer metal coating film, a single-layer dielectric coating film, a multilayer metal coating film, a multilayer dielectric coating film, and a coating film formed by stacking at least one metal coating film and at least one dielectric coating film.

15. The optical anti-counterfeiting element according to claim 14, wherein the at least one dielectric coating film comprises one of a low-refractive-index dielectric film and a high-refractive-index dielectric film.

16. The optical anti-counterfeiting element according to claim 9, wherein the micro-relief structure provides optical reflection and diffraction images, and forms dynamic and stereoscopic images; and/or the micro-relief structure comprises at least one of a diffraction grating, a blazed grating and a random scattering structure.

17. The optical anti-counterfeiting element according to claim 16, wherein a period of the diffraction grating is greater than 0.5 microns and less than 5 microns; and/or a period of the blazed grating is greater than 3 microns and less than 30 microns.

18. An optical anti-counterfeiting product, comprising the optical anti-counterfeiting element according to claim 1.

* * * * *